United States Patent
Bjerre et al.

(10) Patent No.: US 11,301,706 B2
(45) Date of Patent: Apr. 12, 2022

(54) METHOD OF AUTHENTICATING A USER

(71) Applicant: Fingerprint Cards AB, Gothenburg (SE)

(72) Inventors: Troels Bjerre, Valby (DK); René Nilsson, Eslöv (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 17/056,031

(22) PCT Filed: Jun. 5, 2019

(86) PCT No.: PCT/SE2019/050528
§ 371 (c)(1),
(2) Date: Nov. 17, 2020

(87) PCT Pub. No.: WO2019/236001
PCT Pub. Date: Dec. 12, 2019

(65) Prior Publication Data
US 2021/0209391 A1    Jul. 8, 2021

(30) Foreign Application Priority Data

Jun. 8, 2018 (SE) .................... 1850696-4

(51) Int. Cl.
*G06K 9/62* (2006.01)
*G06K 9/03* (2006.01)
(Continued)

(52) U.S. Cl.
CPC ............. *G06K 9/036* (2013.01); *G06F 21/32* (2013.01); *G06K 9/0002* (2013.01); *G06K 9/0008* (2013.01); *G06K 9/2054* (2013.01)

(58) Field of Classification Search
CPC ....................................... G06K 9/00006–0012
See application file for complete search history.

(56) References Cited

U.S. PATENT DOCUMENTS

2004/0155752 A1 * 8/2004 Radke ............... G06K 9/00013
340/5.53
2005/0223236 A1   10/2005 Yamada et al.
(Continued)

FOREIGN PATENT DOCUMENTS

EP    2506188 A2    10/2012
EP    3109793 A1    12/2016
(Continued)

OTHER PUBLICATIONS

International Search Report and Written Opinion for International Application No. PCT/SE2019/050528 dated Sep. 20, 2019, 15 pages.
(Continued)

*Primary Examiner* — Brian Werner
(74) *Attorney, Agent, or Firm* — RMCK Law Group, PLC (57) ABSTRACT

The present disclosure generally relates to a method of authenticating a user, using an electronic device comprising a fingerprint sensor, and more specifically to improvements in relation to how to acquiring an authentication fingerprint image for use in authenticating the user. The present disclosure also relates to a corresponding electronic device and to a computer program product.

16 Claims, 4 Drawing Sheets

(51) Int. Cl.
  *G06F 21/32* (2013.01)
  *G06K 9/00* (2022.01)
  *G06K 9/20* (2006.01)

(56) References Cited

U.S. PATENT DOCUMENTS

| | | |
|---|---|---|
| 2006/0062427 A1 | 3/2006 | Burkhart et al. |
| 2007/0253605 A1 | 11/2007 | Maurer et al. |
| 2013/0287274 A1 | 10/2013 | Shi et al. |
| 2014/0270415 A1 | 9/2014 | Alameh et al. |
| 2014/0359756 A1 | 12/2014 | Alameh et al. |
| 2014/0363055 A1 | 12/2014 | Yamada |
| 2016/0180146 A1 | 6/2016 | Setterberg et al. |
| 2019/0370518 A1* | 12/2019 | Maor .................. A61B 8/5223 |

FOREIGN PATENT DOCUMENTS

| | | |
|---|---|---|
| EP | 3190544 A1 | 7/2017 |
| EP | 3327613 A1 | 5/2018 |
| EP | 3355239 A1 | 8/2018 |
| JP | 2003337949 A | 11/2003 |

OTHER PUBLICATIONS

Extended European Search Report dated May 28, 2021 for EP Application No. 19815129.2, 10 pages.

* cited by examiner

METHOD OF AUTHENTICATING A USER

CROSS-REFERENCE TO RELATED APPLICATIONS

This application is a 371 U.S. National Stage of International Application No. PCT/SE2019/050528, filed Jun. 5, 2019, which claims priority to Swedish Patent Application No. 1850696-4, filed Jun. 8, 2018. The disclosures of each of the above applications are incorporated herein by reference in their entirety.

TECHNICAL FIELD

The present disclosure generally relates to a method of authenticating a user, using an electronic device comprising a fingerprint sensor, and more specifically to improvements in relation to how to acquiring an authentication fingerprint image for use in authenticating the user. The present disclosure also relates to a corresponding electronic device and to a computer program product.

BACKGROUND

Various types of biometric systems are used more and more in order to provide for increased security for accessing an electronic device, thereby providing an enhanced user convenience. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important issues.

However, recently there has been a trend towards larger area fingerprint sensors. In relation to e.g. a mobile phone provided with a touch screen covering a majority of the front side of the mobile phone, such a large area fingerprint sensor may possibly be arranged such that it may be possible to capture a fingerprint image (of a finger of a user) essentially anywhere throughout a total surface area provided by the touch screen. It should be understood that the concept of larger area fingerprint sensors also includes fingerprint sensors at least larger than the size of a general finger.

In performing user authentication using such a large area fingerprint sensor, it is desirable to start by locating the position of the finger. An example of such an implementation is disclosed in US20130287274. Specifically, in US20130287274 there is presented a touch-fingerprint apparatus that has a "large active area" that may function both as a touch screen and as a fingerprint sensor. In a first state a low resolution sampling process is applied to detect a finger touch location. In a second state a high (full) resolution sampling process is applied at the previous detected touch location for acquiring a high resolution fingerprint image of the finger.

Accordingly, the solution presented in US20130287274 efficiently ensures that not the full area of the (large) fingerprint sensor needs to be used for acquiring a fingerprint image to be later used in when performing user authentication.

The fingerprint sensing system according to US20130287274 provides for an excellent showcase of how to efficiently ensure that not the full area of the (large) fingerprint sensor needs to be used for acquiring a fingerprint image to be later used in when performing user authentication. However, there appears to be room for further improvement, specifically allowing for further improvements in how to select an area of the fingerprint sensor to be used for acquiring a fingerprint image for subsequent use in authenticating a user.

SUMMARY

According to an aspect of the present disclosure, it is therefore provided a method of acquiring an authentication fingerprint image of a finger of a user by means of a fingerprint sensing system comprising a fingerprint sensor and processing circuitry connected to the fingerprint sensor, wherein the method comprises the steps of acquiring, by the fingerprint sensor when the fingerprint sensor is arranged in a reduced information capturing mode, a first fingerprint image, determining, by the processing circuitry, an authentication quality for the first fingerprint image, the authentication quality being indicative of a likelihood of extracting fingerprint data relating to the finger of the user for different areas of the first fingerprint image and based on at least one previous successful authentication of the user, identifying, by the processing circuitry and based on the first fingerprint image and the authentication quality of the first fingerprint image, a first area within the first fingerprint image indicative of not being a candidate for authenticating the finger of the user, arranging the fingerprint sensor in a fingerprint authentication information capturing mode, and acquiring, by the fingerprint sensor when the fingerprint sensor is arranged in the fingerprint authentication information capturing mode, the authentication fingerprint image, wherein at least a portion of the first area is excluded from being acquired when acquiring the authentication fingerprint image.

The present disclosure is based upon the realization that it would be preferred to ensure that only the most suitable parts of an area of a fingerprint sensor (defining a fingerprint acquisition area) are "activated" for acquiring e.g. a "high quality" fingerprint image of a finger of a user. That is, in comparison to prior-art the inventors have identified that to further improve processing of an acquired e.g. high quality candidate fingerprint image it would be desirable to exclude parts that do not fulfill a predefined authentication quality measure. Accordingly, not only are the areas where the finger is not present (i.e. areas outside of the finger) excluded, but also areas where the finger is present but where the quality is at an undesirable level (e.g. low quality, saturation or otherwise impaired).

Advantageously, in line with the above it would thereby be possible to allow for a further reduced amount of information is to then be processed for authenticating the user. As a consequence, it may be possible to further reduce the time it takes from when the user is e.g. indicating that he want/needs so be authenticated until the authentication process has been completed. In line with the present disclosure, the first fingerprint image corresponds to at least a portion of the fingerprint acquisition area.

In accordance to the present disclosure, the fingerprint sensor is, as defined above, controlled in different "capture modes", where an in comparison lower amount of information is captured when the fingerprint sensor is arranged in the reduced information capturing mode, as compared to when the fingerprint sensor is arranged in the fingerprint authentication information capturing mode. This may in some implementations of the present disclosure be achieved by arranging the fingerprint sensor to only capture information from a sub area (or selected portion) of a total active area for the fingerprint sensor in a first stage. Conversely, when the fingerprint sensor then is arranged in the fingerprint authentication information capturing mode it is desirable to acquire a high quality fingerprint image (i.e. being the authentication fingerprint image).

In an alternative embodiment, it may be possible to arrange the fingerprint sensor to acquire fingerprint image data at an in comparison lower resolution when in the reduced information capturing mode (such as e.g. every second pixel in case the fingerprint sensor is arranged as a matrix structure). Correspondingly, when acquiring the authentication fingerprint image, the fingerprint sensor may be adapted to capture e.g. using essentially the full potential of the fingerprint sensor (such as capturing using essentially all pixels in regard to the example given above).

In line with the present disclosure, it may generally be desirable to determining an image quality metric for the first fingerprint image. Such a determination may for example comprise identifying fingerprint features within the first fingerprint image. That is, if e.g. fingerprint features are considered to be "easily" identifiable within some areas of the first fingerprint image but not in some other areas of the first fingerprint image, then the areas where the fingerprint features are not so easily identifiable are to be excluded from the subsequent acquisition of the authentication fingerprint image. The identified fingerprint features may for example comprise at least one of a fingerprint core, a bifurcation point, ridges, and valleys. The image quality metric may as such form part of the authentication quality for the first fingerprint image.

Preferably, the method according to the present disclosure additionally comprises authenticating the user based on the authentication fingerprint image and a predetermined fingerprint template for the finger of the user. The fingerprint template is preferably formed at an earlier point in time, e.g. in relation to an enrollment process as is known in the art.

The authentication quality is further based on at least one previous successful authentication of the user. According to such an embodiment, a historical performance of how well a user was authenticated at one or a plurality of previous authentication steps may be taken into account for selecting what areas to exclude when capturing the authentication fingerprint image. In line with such an embodiment it may thus be possible to further reduce the time it takes when acquiring the authentication fingerprint image and subsequently authenticating the user. That is, it may be possible to make use of e.g. previous authentications where some areas of the captured fingerprint were deemed "not useful" in regards to authenticate the user. Information in regard to such areas could then (later) be used for selecting what areas to not include when acquiring the authentication fingerprint image (when the sensor is in the fingerprint authentication information capturing mode)

As a further alternative, the authentication quality could also (or instead) be defined to relate to specific areas of the finger that are specifically of interest to use in the authentication process, thus placing focus on them when selecting what area to acquire in relation to the authentication fingerprint image.

It may in some embodiments of the present disclosure be preferred to, if the authentication is unsuccessful, adapt the method to comprise the step of adjusting, by the processing circuitry, a size of the first area, resulting in a second area, acquiring, by the fingerprint sensor when the fingerprint sensor is arranged in the fingerprint authentication information capturing mode, an updated authentication fingerprint image, wherein at least a portion of the second area is excluded from being acquired when acquiring the updated authentication fingerprint image, and authenticating the user based on the updated authentication fingerprint image and the predetermined fingerprint template for the finger of the user.

In line with the present disclosure, the method may further comprise the step of providing, by said processing circuitry, an authentication signal indicative of a result of authenticating the finger of the user. Such a signal may subsequently be used for e.g. "unlocking" the electronic device, for allowing further restricted (personal) use of the electronic device.

Preferably, when in the reduced information capturing mode a sub portion of the fingerprint sensor is arranged in a capturing mode. Accordingly, in such an embodiment e.g. the first fingerprint image may be acquired when in the reduced information capturing mode corresponds to a minor portion of the fingerprint sensor, such as less than 50% of the fingerprint sensor. For example, in the reduced information capturing mode the first fingerprint image comprising less than 50×50 pixels is acquired.

Correspondingly, the authentication fingerprint image may be acquired when in the fingerprint authentication capturing mode corresponds to a major portion of the fingerprint sensor, such as more than 50% of the fingerprint sensor. As such, when in the fingerprint authentication capturing mode the authentication fingerprint image corresponding to a major portion of an active area of the fingerprint sensor is acquired (e.g. more than 50% of the fingerprint sensor).

According to the present disclosure, the processing circuitry is preferably an ASIC, a microprocessor or any other type of computing device for controlling the operation of the fingerprint sensor. As such, the processing circuitry may form an integral part of the second user input device. However, the processing circuitry may also be a general control unit comprised with the electronic device, for example configured for controlling the overall operation of the electronic device.

The fingerprint sensor may, as indicated above, be implemented using any kind of currently or future fingerprint sensing principles, including for example capacitive, optical, thermal or ultrasonic sensing technology.

As mentioned above, the fingerprint sensor is configured to include an array of pixels for generating the fingerprint images. In a possible embodiment the fingerprint sensor is configured to include an array comprising at least 64×64 pixels. Any other differently sized fingerprint sensor is of course possible and within the scope of the present disclosure. In case of applying capacitive sensing technology, each pixel includes a capacitive element and the system captures the fingerprint images by detecting changes in capacitance of the capacitive elements.

According to another aspect of the present disclosure, there is provided an electronic device, comprising a fingerprint sensing system comprising a fingerprint sensor and processing circuitry connected to the fingerprint sensor, wherein the electronic devices is adapted to acquire, by the fingerprint sensor when the fingerprint sensor is arranged in a reduced information capturing mode, a first fingerprint image, determine, by the processing circuitry, an authentication quality for the first fingerprint image, the authentication quality being indicative of a likelihood of extracting fingerprint data relating to the finger of the user for different areas of the first fingerprint image and based on at least one previous successful authentication of the user, identify, by the processing circuitry and based on the first fingerprint image and the authentication quality of the first fingerprint image, a first area within the first fingerprint image indicative of not being a candidate for authenticating the finger of the user, arrange the fingerprint sensor in a fingerprint authentication information capturing mode, and acquire, by the fingerprint sensor when the fingerprint sensor is arranged in the fingerprint authentication information capturing mode, the authentication fingerprint image, wherein at least a portion of the first area is excluded from being acquired when acquiring the authentication fingerprint image. This aspect of the present disclosure provides similar advantages as discussed above in relation to the previous aspect of the present disclosure.

In a possible embodiment of the present disclosure the electronic device is portable and implemented as e.g. a mobile phone, a tablet or a laptop, etc.

According to a further aspect of the present disclosure, there is provided a computer program product comprising a non-transitory computer readable medium having stored thereon computer program means for operating a fingerprint sensing system comprising a fingerprint sensor and processing circuitry connected to the fingerprint sensor, wherein the computer program product comprises code for acquiring, by the fingerprint sensor when the fingerprint sensor is arranged in a reduced information capturing mode, a first fingerprint image, code for determining, by the processing circuitry, an authentication quality for the first fingerprint image, the authentication quality being indicative of a likelihood of extracting fingerprint data relating to the finger of the user for different areas of the first fingerprint image and based on at least one previous successful authentication of the user, code for identifying, by the processing circuitry and based on the first fingerprint image and the authentication quality of the first fingerprint image, a first area within the first fingerprint image indicative of not being a candidate for authenticating the finger of the user, code for arranging the fingerprint sensor in a fingerprint authentication information capturing mode, and code for acquiring, by the fingerprint sensor when the fingerprint sensor is arranged in the fingerprint authentication information capturing mode, the authentication fingerprint image, wherein at least a portion of the first area is excluded from being acquired when acquiring the authentication fingerprint image. Also this aspect of the present disclosure provides similar advantages as discussed above in relation to the previous aspects of the present disclosure.

As mentioned above, the processing circuitry is preferably an ASIC, a microprocessor or any other type of computing device. Similarly, a software executed by the control unit for operating the inventive system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Figure 1A:
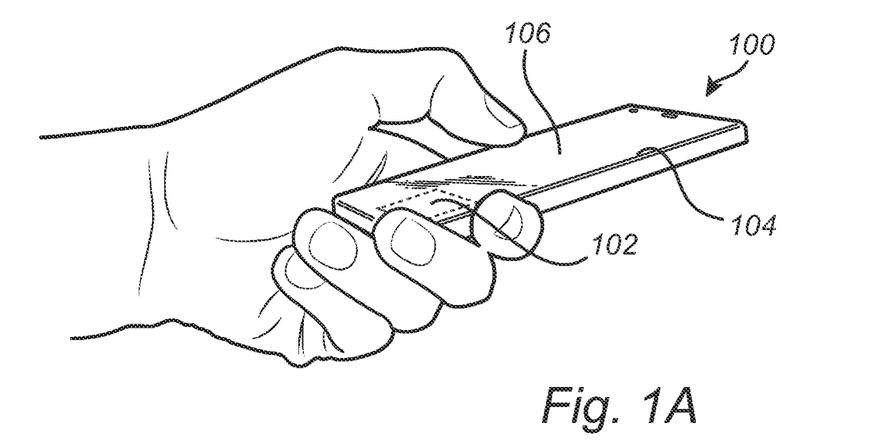
FIGS. 1A and 1B schematically exemplifies embodiment of the electronic device according to the present disclosure, in the form of a mobile phone comprising an integrated fingerprint sensor.

Turning now to the drawings and to FIG. 1A in particular, there is schematically illustrated an example embodiment of the electronic device according to the present disclosure, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone, etc. Further functionality provided using the fingerprint sensor 102 will be discussed below.

Figures 1B, 2:
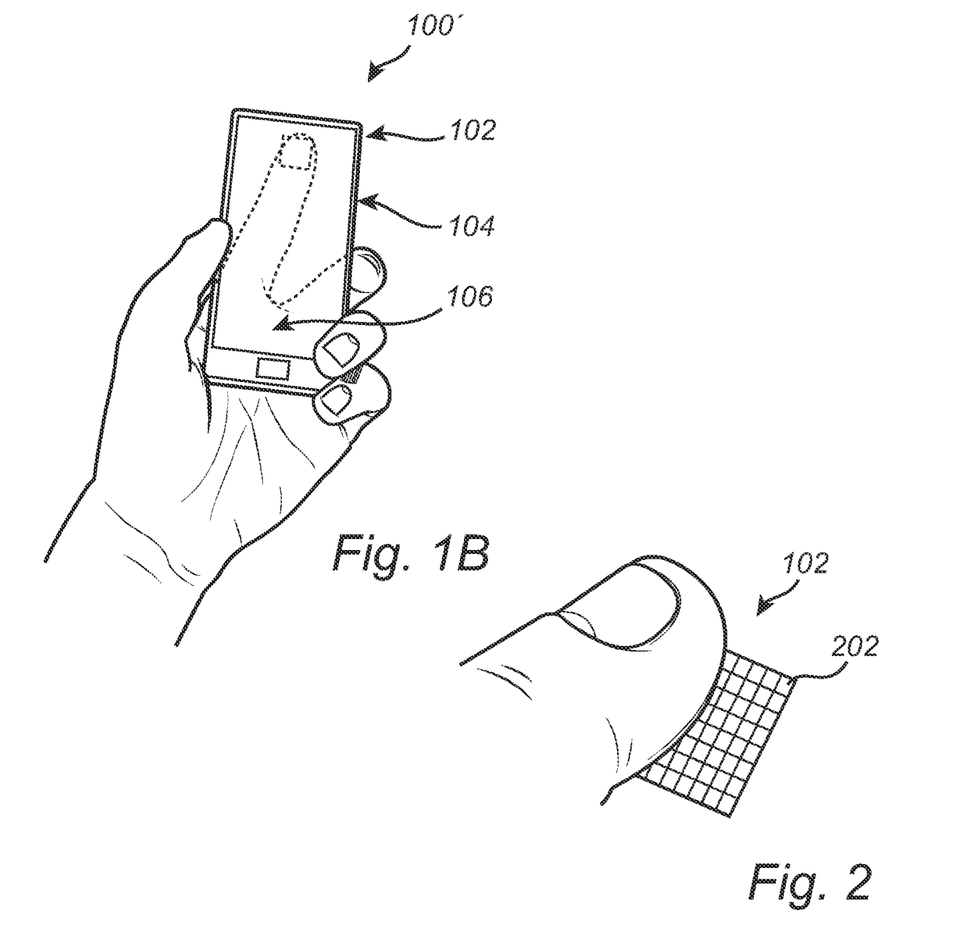
FIG. 2 schematically shows the fingerprint sensor array comprised in the electronic device in FIGS. 1A or 1B.

FIG. 1B schematically illustrates an alternative embodiment of the electronic device according to the present disclosure, where the display unit 104 is still arranged at the front side of the mobile phone 100', having the fingerprint sensor 102 alternatively arranged at the backside of the mobile phone 100'. It may of course be possible to allow the fingerprint sensor 102 to in an alternative embodiment (or also) to be side mounted at the mobile phone 100/100'.

Preferably and as is apparent for the skilled person, the mobile phone 100/100' shown in FIGS. 1*a* and 1*b* further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the present disclosure may be applicable in relation to any other type of electronic device, such as a laptop, a remote control, a tablet computer, or any other type of present or future similarly configured device.

With further reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment where 160×160 pixels are used. Other sizes are of course possible and within the scope of the present disclosure, including two-dimensional array with less pixels as compared to the above example. A single sensing element (also denoted as a pixel) is in FIG. 2 indicated by reference numeral 202. It should however, as indicated above, be understood that the present disclosure may be applicable also to other types of fingerprint sensing technologies, such as optical, thermal, ultrasonic, etc.), as well as a combination thereof.

Figure 3A:
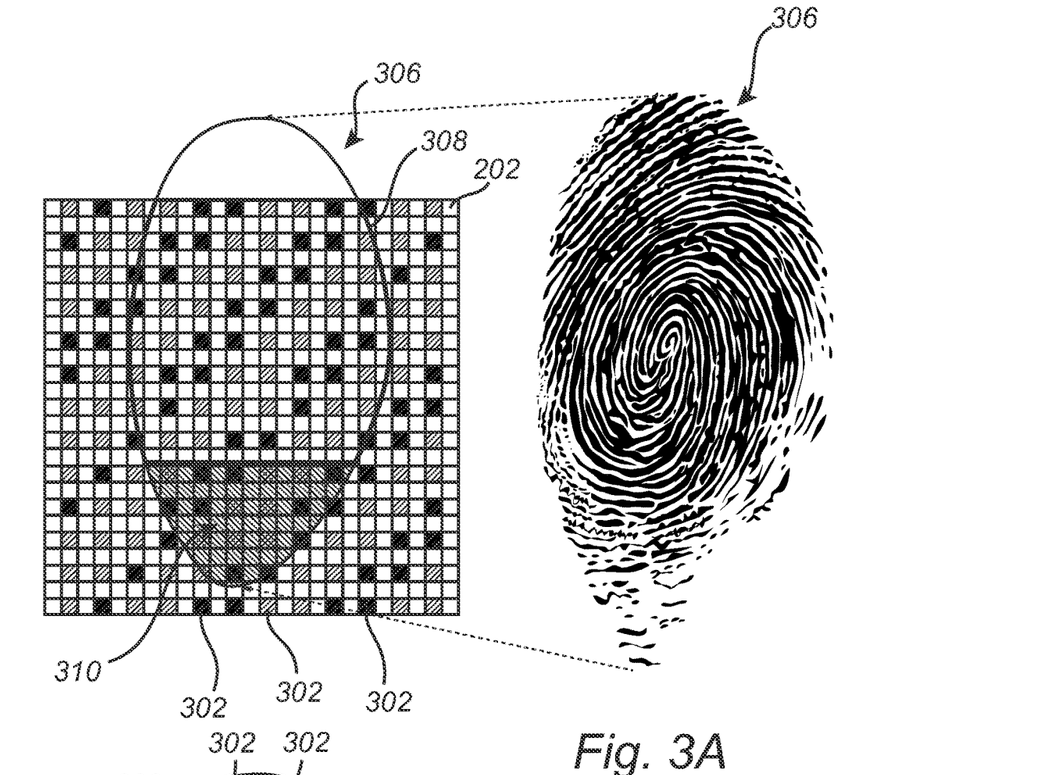
FIGS. 3A and 3B illustrate an example of a fingerprint image acquisition sequence in line with the present disclosure, and FIG. 3C illustrate a resulting authentication fingerprint image.
Figure 3B:
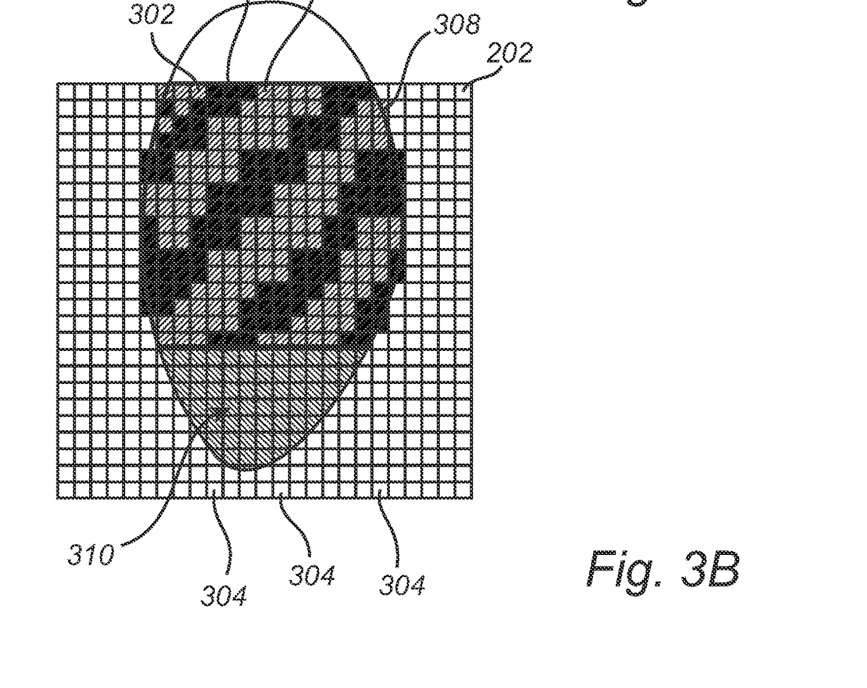
Figure 3C:
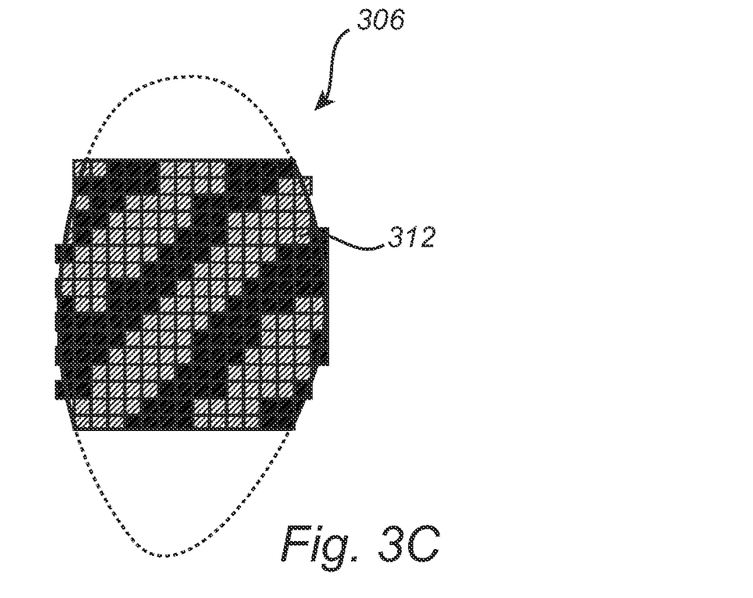
Figure 5:
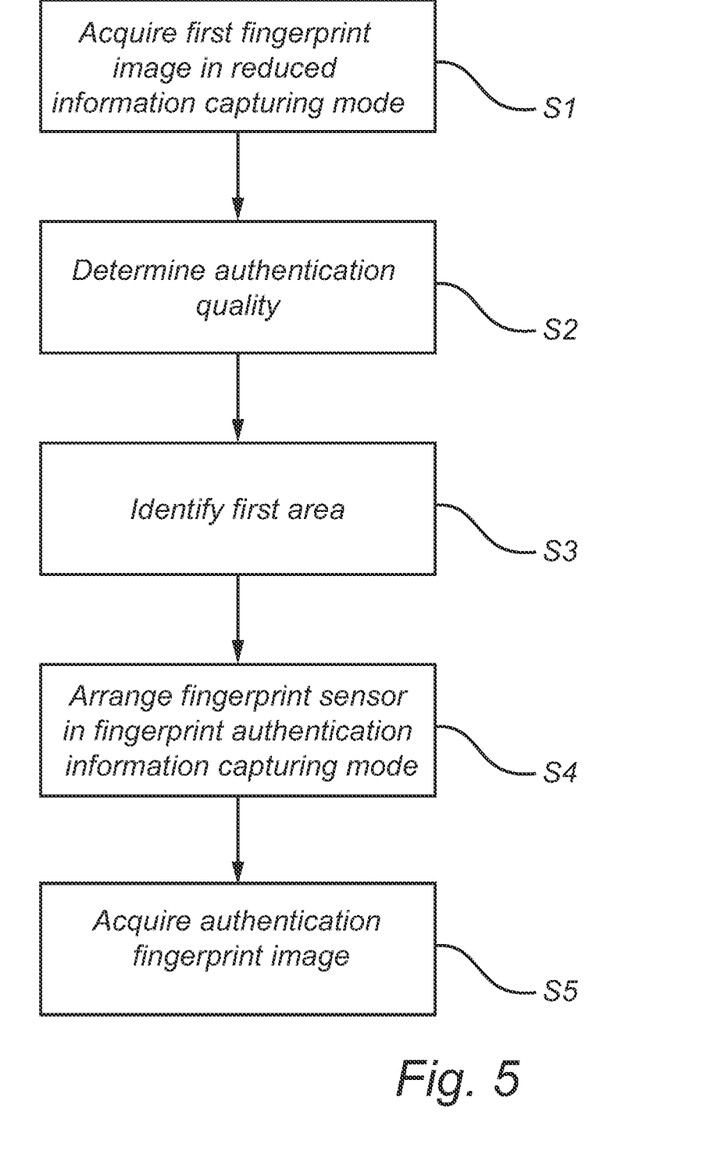
FIG. 5 is a flowchart illustrating the operation of the electronic device according to the present invention.

Turning to FIGS. 3A-3C presented in conjunction with FIG. 5, there is presented an example of a fingerprint image acquisition sequence in line with the present disclosure, and a resulting authentication fingerprint image. In FIG. 3A, the fingerprint sensor 102 is illustrated as being arranged in the above mentioned reduced information capturing mode. Specifically, in FIG. 3A it is exemplified that the only every second pixel 202 is "active" meaning that only a quarter (may alternatively be more even less) of the full active area of the fingerprint sensor will be used for capturing a fingerprint image. Accordingly, an in comparison low resolution fingerprint image will be acquired when the fingerprint sensor 102 is arranged in the reduced information capturing mode. It may of course be possible to arrange the fingerprint sensor in other ways for achieving a similar effect, i.e. a setting for the fingerprint sensor 102 where not all of the active area is used for acquiring such a fingerprint image. For example, as an alternative "blocks" of pixels could for example be active (2×2, 4×4, 1×8, etc.), where other blocks may be controlled to be "inactive". In FIG. 3A the active pixels 202 are denoted as 302 and the inactive pixels 102 are denoted as 304.

As will be seen in FIG. 3A, a finger 306 is positioned to at least partly overlap with the active area of the fingerprint sensor 102, where the portion of the finger within the active area of the fingerprint sensor 102 is denoted as 308. A first fingerprint image will then be acquired, S1, where the fingerprint sensor 102 as discussed above will be within the reduced information capturing mode. The first fingerprint image may in some preferred embodiments correspond to the full active area of the fingerprint sensor 102.

Based on the first fingerprint image, an authentication quality will be determined, S2. This determination may be implemented in different ways. For example, it may be possible to perform a fingerprint feature identification based on the first fingerprint image. As an alternative, any form of known (or future) quality metric may be applied for determining the authentication quality from the first fingerprint image. Still further, the authentication quality may include previously acquired fingerprint images, i.e. historical information may be used for determining this authentication quality ("known" good or bad parts of e.g. the finger 306).

The authentication quality will accordingly provide an indication of where the finger is overlapping with the active area of the fingerprint sensor. However, in addition the authentication quality will provide information as to where it is "likely" possible to in a successful manner extract relevant fingerprint data relating to the finger of the user. As such, the authentication quality be used for identifying, S3, a first area within the first fingerprint image indicative of not being a candidate for authenticating the finger of the user.

This first area will of course comprise portions of the total area of the fingerprint sensor 102 where no finger is located. However, the first area will also include a portion 310 of where the finger is in fact located, but where it has been determined (based on the authentication quality) that there is an in comparison a low likelihood of successfully e.g. extracting identifiable fingerprint features.

Once the first area has been determined, the fingerprint sensor will subsequently be arranged, S4, in a fingerprint authentication information capturing mode. As discussed above, the fingerprint authentication information capturing mode may generally be defined as a capturing mode where "as much information as possible" is acquired. That is, the fingerprint authentication information capturing mode may typically be seen as a high resolution capturing mode.

Accordingly, once the fingerprint sensor has been arranged in the fingerprint authentication information capturing mode, an authentication fingerprint image is to be acquired. However, rather than acquiring an image corresponding to the full active area of the fingerprint sensor 102, the fingerprint sensor 102 will be arranged to exclude the first area. Accordingly, with reference to FIG. 3B, only a few pixels 202 are "activated", i.e. the inverse of the first area in comparison to the full active area of the fingerprint sensor 102 will be active for acquiring, S5, the authentication fingerprint image.

An exemplary illustration of the authentication fingerprint image is shown in FIG. 3C, denoted as 312. The authentication fingerprint image 312 thus only corresponds to a portion of the full finger 306 of the user.

Thereby, rather than having to process unsuitable portions of the full finger 306, e.g. the "best" portion (i.e. the authentication fingerprint image 312) may be used in a subsequent step of authenticating the user.

Figure 4:
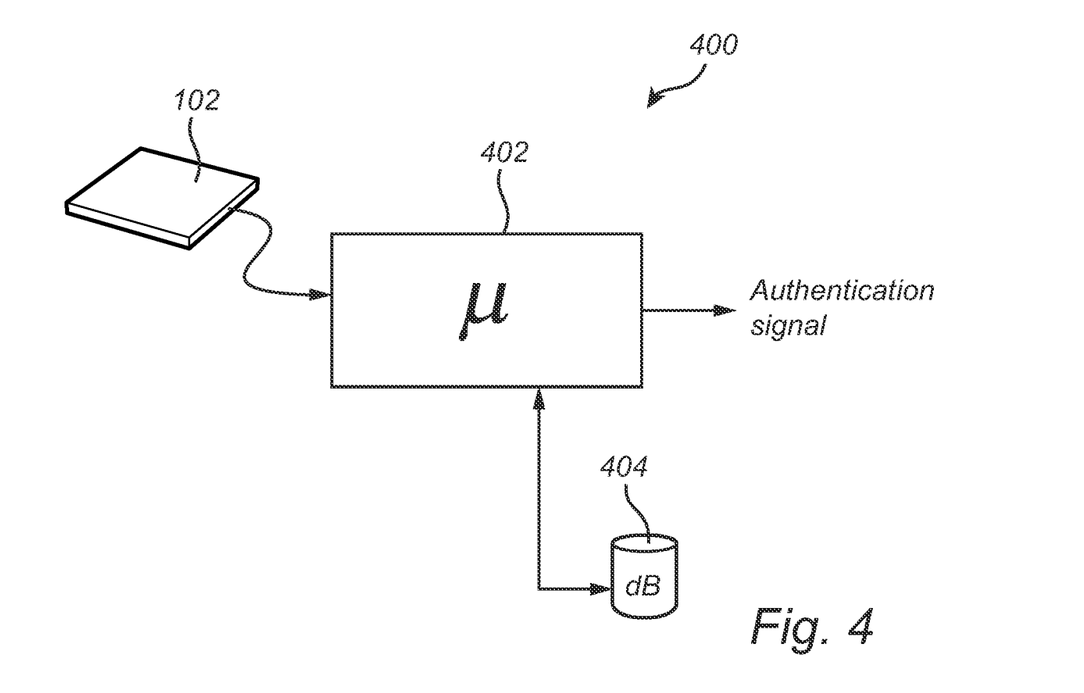
FIG. 4 conceptually illustrates a fingerprint sensing system according to a currently preferred embodiment of the present disclosure.

In accordance with the invention, the fingerprint sensor 102 and the operation for acquiring a fingerprint image is achieved using a conceptualized fingerprint sensor system 400 as is illustrated in FIG. 4. The fingerprint sensor system 400 in turn, typically, forms part of the electronic device/mobile as is exemplified in FIG. 1.

The fingerprint sensor system 400 comprises the fingerprint sensor 102 and a processing circuitry, such as a control unit 402 for controlling the fingerprint sensor 102. The fingerprint sensor system 400 further comprises a memory, such as a database 404, e.g. storing a fingerprint template for the user. The control unit 402 may each include a microprocessor, microcontroller, programmable digital signal processor or another programmable device. The control unit 402 may also, or instead, each include an application specific integrated circuit, a programmable gate array or programmable array logic, a programmable logic device, or a digital signal processor. Where the control unit 402 includes a programmable device such as the microprocessor, microcontroller or programmable digital signal processor mentioned above, the processor may further include computer executable code that controls operation of the programmable device. It should be understood that all or some parts of the functionality provided by means of the control unit 402 (or generally discussed as "processing circuitry") may be at least partly integrated with the fingerprint sensor 402.

When performing the step for authenticating the user, the authentication fingerprint image 312 will be used for identifying/extracting fingerprint features relating to the user, e.g. denoted as candidate fingerprint features. These candidate fingerprint features are then compared/matched with corresponding information comprised with the fingerprint template for the user (e.g. stored in the database 404). In case there is a match, the control unit 402 may output an authentication signal. The authentication signal may subsequently be used for e.g. unlocking the mobile phone 100, 100'.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of acquiring an authentication fingerprint image of a finger of a user by means of a fingerprint sensing system comprising a fingerprint sensor and processing circuitry connected to the fingerprint sensor, wherein the method comprises the steps of:
    acquiring, by the fingerprint sensor when the fingerprint sensor is arranged in a reduced information capturing mode, a first fingerprint image,
    determining, by the processing circuitry, an authentication quality for the first fingerprint image, the authentication quality being indicative of a likelihood of extracting fingerprint data relating to the finger of the user for different areas of the first fingerprint image and based on at least one previous successful authentication of the user,
    identifying, by the processing circuitry and based on the first fingerprint image and the authentication quality of the first fingerprint image, a first area within the first fingerprint image indicative of not being a candidate for authenticating the finger of the user,
    arranging the fingerprint sensor in a fingerprint authentication information capturing mode,
    acquiring, by the fingerprint sensor when the fingerprint sensor is arranged in the fingerprint authentication information capturing mode, the authentication fingerprint image, wherein at least a portion of the first area is excluded from being acquired when acquiring the authentication fingerprint image, and
    authenticating the user based on the authentication fingerprint image and a predetermined fingerprint template for the finger of the user,
    wherein, if the authentication is unsuccessful, the method further comprises:
        adjusting, by the processing circuitry, a size of the first area, resulting in a second area,
        acquiring, by the fingerprint sensor when the fingerprint sensor is arranged in the fingerprint authentication information capturing mode, an updated authentication fingerprint image, wherein at least a portion of the second area is excluded from being acquired when acquiring the updated authentication fingerprint image, and
        authenticating the user based on the updated authentication fingerprint image and the predetermined fingerprint template for the finger of the user.

2. The method according to claim 1, wherein determining the authentication quality comprises determining an image quality metric for the first fingerprint image.

3. The method according to claim 1, wherein determining the authentication quality comprises identifying fingerprint features within the first fingerprint image.

4. The method according to claim 3, wherein the identified fingerprint features comprises at least one of a fingerprint core, a bifurcation point, ridges, and valleys.

5. The method according to claim 1, wherein identifying the first area within the first fingerprint image is further based on a previous determination of the first area.

6. The method according to claim 1, further comprising the step of:
    providing, by said processing circuitry, an authentication signal indicative of a result of authenticating the finger of the user.

7. The method according to claim 1, wherein when in the reduced information capturing mode a sub portion of the fingerprint sensor is arranged in a capturing mode.

8. The method according to claim 1, wherein the first fingerprint image acquired when in the reduced information capturing mode corresponds to less than half of the fingerprint sensor.

9. The method according to claim 7, wherein when in the reduced information capturing mode the first fingerprint image comprising less than 50×50 pixels or 10 $mm^2$ is acquired.

10. The method according to claim 1, wherein the authentication fingerprint image acquired when in the fingerprint authentication capturing mode corresponds to more than half of the fingerprint sensor.

11. The method according to claim 10, wherein when in the fingerprint authentication capturing mode the authentication fingerprint image corresponding to more than half of an active area of the fingerprint sensor is acquired.

12. An electronic device, comprising:
a fingerprint sensing system comprising a fingerprint sensor and processing circuitry connected to the fingerprint sensor,
wherein the electronic devices is adapted to:
acquire, by the fingerprint sensor when the fingerprint sensor is arranged in a reduced information capturing mode, a first fingerprint image,
determine, by the processing circuitry, an authentication quality for the first fingerprint image, the authentication quality being indicative of a likelihood of extracting fingerprint data relating to the finger of the user for different areas of the first fingerprint image and based on at least one previous successful authentication of the user,
identify, by the processing circuitry and based on the first fingerprint image and the authentication quality of the first fingerprint image, a first area within the first fingerprint image indicative of not being a candidate for authenticating the finger of the user,
arrange the fingerprint sensor in a fingerprint authentication information capturing mode,
acquire, by the fingerprint sensor when the fingerprint sensor is arranged in the fingerprint authentication information capturing mode, the authentication fingerprint image, wherein at least a portion of the first area is excluded from being acquired when acquiring the authentication fingerprint image, and
authenticate the user based on the authentication fingerprint image and a predetermined fingerprint template for the finger of the user,
wherein, if the authentication is unsuccessful, the electronic devices is further adapted to:
adjust, by the processing circuitry, a size of the first area, resulting in a second area,
acquire, by the fingerprint sensor when the fingerprint sensor is arranged in the fingerprint authentication information capturing mode, an updated authentication fingerprint image, wherein at least a portion of the second area is excluded from being acquired when acquiring the updated authentication fingerprint image, and
authenticate the user based on the updated authentication fingerprint image and the predetermined fingerprint template for the finger of the user.

13. The electronic device according to claim 12, wherein the fingerprint sensor is employing at least one of capacitive, optical, thermal and ultrasonic sensing technology.

14. The electronic device according to claim 12, wherein the fingerprint sensor comprises at least 64×64 pixels.

15. The electronic device according to claim 12, wherein the electronic device is a mobile phone, a tablet or a laptop.

16. A computer program product comprising a non-transitory computer readable medium having stored thereon computer program means for operating a fingerprint sensing system comprising a fingerprint sensor and processing circuitry connected to the fingerprint sensor, wherein the computer program product comprises:
code for acquiring, by the fingerprint sensor when the fingerprint sensor is arranged in a reduced information capturing mode, a first fingerprint image,
code for determining, by the processing circuitry, an authentication quality for the first fingerprint image, the authentication quality being indicative of a likelihood of extracting fingerprint data relating to the finger of the user for different areas of the first fingerprint image and based on at least one previous successful authentication of the user,
code for identifying, by the processing circuitry and based on the first fingerprint image and the authentication quality of the first fingerprint image, a first area within the first fingerprint image indicative of not being a candidate for authenticating the finger of the user,
code for arranging the fingerprint sensor in a fingerprint authentication information capturing mode,
code for acquiring, by the fingerprint sensor when the fingerprint sensor is arranged in the fingerprint authentication information capturing mode, the authentication fingerprint image, wherein at least a portion of the first area is excluded from being acquired when acquiring the authentication fingerprint image,
code for authenticating the user based on the authentication fingerprint image and a predetermined fingerprint template for the finger of the user, and
code for, if the authentication is unsuccessful:
adjusting, by the processing circuitry, a size of the first area, resulting in a second area,
acquiring, by the fingerprint sensor when the fingerprint sensor is arranged in the fingerprint authentication information capturing mode, an updated authentication fingerprint image, wherein at least a portion of the second area is excluded from being acquired when acquiring the updated authentication fingerprint image, and
authenticating the user based on the updated authentication fingerprint image and the predetermined fingerprint template for the finger of the user.

* * * * *